US008016068B2

(12) United States Patent
Daniel et al.

(10) Patent No.: US 8,016,068 B2
(45) Date of Patent: Sep. 13, 2011

(54) SYSTEM AND METHOD FOR LOAD BALANCING IN A TANDEM WHEEL ARRANGEMENT

(75) Inventors: Steven A. Daniel, East Peoria, IL (US); Norval P. Thomson, Dunlap, IL (US); Daniel Sergison, East Peoria, IL (US); John V. Mount, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 204 days.

(21) Appl. No.: 12/256,950

(22) Filed: Oct. 23, 2008

(65) Prior Publication Data

US 2010/0102537 A1 Apr. 29, 2010

(51) Int. Cl.
*B60G 5/00* (2006.01)
(52) U.S. Cl. .......... 180/306; 180/307; 180/24.07; 280/678; 280/124.16
(58) Field of Classification Search .......... 180/22, 180/24.02, 24.06–24.08, 24.11, 53.4, 53.8, 180/305–308; 280/124.157, 124.16, 676–678
See application file for complete search history.

(56) References Cited

U.S. PATENT DOCUMENTS

| | | | |
|---|---|---|---|
| 2,132,059 A | 10/1938 | Trembly | |
| 2,391,948 A | 1/1946 | Couse | |
| 2,721,405 A | 10/1955 | Gardner | |
| 2,775,925 A | 1/1957 | Greiner | |
| 3,175,841 A | 3/1965 | Smith | |
| 3,299,978 A * | 1/1967 | Sponsler | 180/9.52 |
| 3,366,399 A | 1/1968 | Hunger | |
| 3,409,100 A | 11/1968 | Kronqvist | |
| 3,603,423 A | 9/1971 | Schoonover | |
| 3,831,693 A | 8/1974 | King | |
| 4,056,158 A | 11/1977 | Ross | |
| 4,462,477 A | 7/1984 | Mastro | |
| 4,572,311 A | 2/1986 | Oswald et al. | |
| 4,632,625 A | 12/1986 | Schuller et al. | |
| 5,290,201 A * | 3/1994 | Tesker | 460/116 |
| 5,308,216 A | 5/1994 | Herolf | |
| 5,339,611 A | 8/1994 | Roderfeld et al. | |
| 5,540,203 A * | 7/1996 | Foulkes et al. | 123/446 |
| 5,655,615 A * | 8/1997 | Mick | 180/24.02 |
| 6,364,340 B1 | 4/2002 | Taylor | |
| 6,550,505 B2 * | 4/2003 | Nault et al. | 144/336 |
| 6,848,533 B2 * | 2/2005 | Beck | 180/378 |
| 7,258,182 B2 | 8/2007 | Auer | |

FOREIGN PATENT DOCUMENTS

DE 196 16 405 * 10/1997

* cited by examiner

*Primary Examiner* — Paul N. Dickson
*Assistant Examiner* — George D. Spisich
(74) *Attorney, Agent, or Firm* — Leydig, Voit & Mayer (57) ABSTRACT

A tandem drive arrangement includes one or more independently driven wheels (118) that are arranged in a tandem configuration along a beam (120). The beam (120) is rotatably connected to a frame (102) of a machine (100). The tandem drive arrangement further includes an actuator (206) operating to selectively impart a rotating moment to the beam (102). The rotating moment tends to rotate the beam (120) in one direction and counteracts a torque imbalance resulting from operation of motors (128) rotating one or more independently driven wheels (118) connected to the beam (120).

16 Claims, 5 Drawing Sheets

SYSTEM AND METHOD FOR LOAD BALANCING IN A TANDEM WHEEL ARRANGEMENT

TECHNICAL FIELD

This patent disclosure relates generally to tandem wheel arrangements and, more particularly, to load balancing of tandem wheel arrangements that include one or more driven wheels arranged in a tandem configuration.

BACKGROUND

Tandem wheel arrangements typically have two or more wheels arranged in line with each other. Earthmoving machines, for example, use tandem wheel arrangements for applications requiring traction and stability while operating over rough terrain. One such machine is a motor grader, which is a type of machine that is typically used to create a flat or graded surface on a landscape. Other examples of machines or vehicles having tandem drive arrangements include trucks, trains, moving platforms, gantry cranes, military vehicles, and so forth. Tandem wheel arrangements may employ hydraulic, electrical, or mechanical power to propel one or more of the wheels in the arrangement.

A typical drive configuration for tandem wheels includes a rotating input sprocket that powers one or more wheels of the arrangement via chains. The sprocket, chains, and associated gears are typically enclosed within an enclosure or beam, which is pivotally connected to the machine on the centerline of the sprocket. The chains are arranged to provide torque to each driven wheel and the input torque to the sprocket must equal the sum of the output torques to the wheels, otherwise, a moment may be applied to the tandem drive arrangement. This moment may cause instabilities, for example, by lifting a portion of the tandem wheel arrangement relative to another portion such that one or more wheels of the arrangement cannot fully engage the driving surface.

A common application of tandem wheel arrangements includes two wheels. Such arrangements typically have both wheels capable of powered rotation, preferably at equal torques, such that the tandem arrangement remains balanced and stable.

SUMMARY

The disclosure describes, in one aspect, a tandem drive arrangement that includes one or more independently driven wheels. The wheels are arranged in a tandem configuration along a beam that is rotatably connected to a frame of a machine. The tandem drive arrangement further includes an actuator operating to selectively impart a rotating moment onto the beam, which tends to rotate the beam in one direction. When rotation of the one or more independently driven wheels causes a torque imbalance tending to rotate the beam, the torque imbalance is counteracted by the rotating moment of the actuator.

In another aspect, this disclosure describes a machine that includes a hydraulic system having a variable displacement hydraulic pump connected to an output of an engine. The hydraulic system includes at least one hydraulic motor connected to a drive wheel of the machine and to a tandem beam. The machine further includes a frame having a chassis pin extending therefrom. The beam is rotatably connected to the frame and has at least one motor connected at one end thereof. A drive wheel is connected to the at least one motor and at least one additional wheel is associated with the beam in tandem arrangement with the drive wheel. A linear actuator is rotatably connected at one end to the chassis pin and at another end to the tandem beam at a drive pin. The linear actuator operates to impart a moment tending to rotate the tandem beam when the linear actuator extends or retracts.

In yet another aspect, the disclosure provides a method for balancing load in a tandem drive arrangement. The tandem drive arrangement includes at least one independently driven wheel operated by a motor, which creates a torque imbalance tending to rotate a tandem beam relative to a frame of a machine. The tandem beam includes at least one additional wheel that tends to lose contact with the ground when the tandem beam rotates due to the torque imbalance. The method includes applying a force on the tandem beam with an actuator. The force produces a rotating moment that counteracts the torque imbalance to maintain contact between the at least one additional wheel and the ground.

DETAILED DESCRIPTION

Figure 1A:
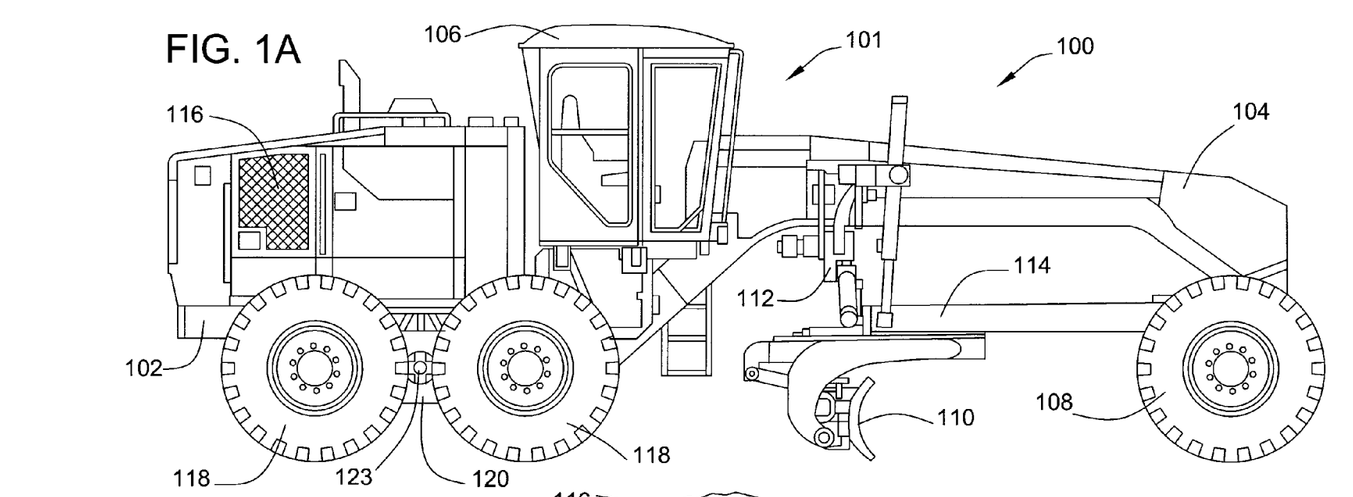
FIG. 1A and FIG. 1B are outline views of, respectively, a side and a partial bottom perspective of a motor grader machine in accordance with the disclosure.

A side view of a machine 100, in this example a motor grader 101, is shown in FIG. 1A. The term "machine" is used generically to describe any machine having at least one drive wheel that is directly driven by a motor connected to the wheel, for example, by use of electrical or hydrostatic power. A machine having a hydrostatically operated propel circuit for moving the machine across the terrain and a hydraulically operated implement circuit operating an implement for performing various machine tasks is described herein for the sake of illustration, but any other mode of powering the machine is contemplated, for example, by use of electrically operated motors and/or actuators. For instance, an alternative embodiment for the machine 100 may include a generator or another device capable of producing an alternative form of energy, such as electrical power.

Figure 1B:
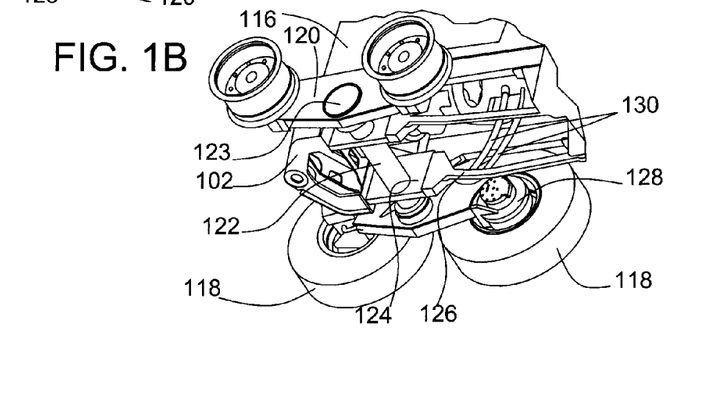

The motor grader 101 shown in FIG. 1 generally includes a two-piece frame made up of an engine frame 102 and an implement portion 104. Alternatively, the motor grader 101 may include a single frame piece. The engine frame 102 in the embodiment shown is connected to the implement portion 104 by a pivot (not shown). The implement portion 104 includes an operator cab 106 and two idle wheels 108 (only one visible) that contact the ground. A shovel or blade 110 is suspended along a mid-portion of the implement portion 104. The blade 110 can be selectively adjusted to engage the ground at various heights and angles to achieve a desired grade or contour while the motor grader 101 operates. Adjustment of the position of the blade 110 is accomplished by a system of actuators, generally denoted in FIG. 1A as 112, while support for the loading experienced by the blade 110 during operation is accomplished by a bar 114, which pivotally connects the implement portion 104 to the blade 110.

The engine frame 102 supports an engine (not visible), which is protected from the elements by an engine cover 116. The engine provides the power necessary to propel the motor grader 101, as well as to operate the various actuators and systems of the motor grader 101. As can be appreciated, other machines may have different configurations and/or various other implements associated therewith.

In a hydrostatically operated machine, the engine in the engine frame 102 may be associated with a hydrostatic pump (not shown), which may be part of a hydraulic system operating a propel system of the motor grader 101. In the embodiment shown, the motor grader 101 is driven by two sets of drive wheels 118 (only one set visible), with each set including two wheels 118 that are arranged in a tandem configuration along a beam 120. As can be more readily seen in the view of FIG. 1B, which is a bottom perspective of the engine frame 102 of the motor grader 101, two beams 120 are pivotally connected on the ends of a shaft or axle 122 at a respective pivot joint or bearing 123, with one beam 120 disposed on either side of the motor grader 101.

The axle 122, which is optional, is connected to the engine frame 102 of the motor grader 101 via two mounting plates 124 and two stabilizer bars 126, such that the drive wheels 118 can effectively propel the motor grader 101. In an alternative embodiment, the axle 122 may be omitted and the beams 120 may instead be pivotally connected directly to the engine frame 102. At least one or both of the two drive wheels 118 on the beam 120 may be actively rotated or driven by a corresponding motor 128. When only one wheel 118 is powered, the other wheel 118 may be idle or, stated differently, may be free to rotate relative to the beam 120. In the embodiment shown in FIG. 1B, for example, the drive wheel 118 shown toward the right hand side of the figure is powered by a motor 128, while the drive wheel 118 shown toward the left hand side of the figure is idle and, thus, does not have a motor 128 associated therewith. Two motors 128 may be connected, one each, at corresponding ends of the two beams 120. A set of conduits 130 (only one set shown) may connect each motor 128 to an appropriate circuit of the motor grader 101 that can supply power to operate the motors 128.

Figure 2:
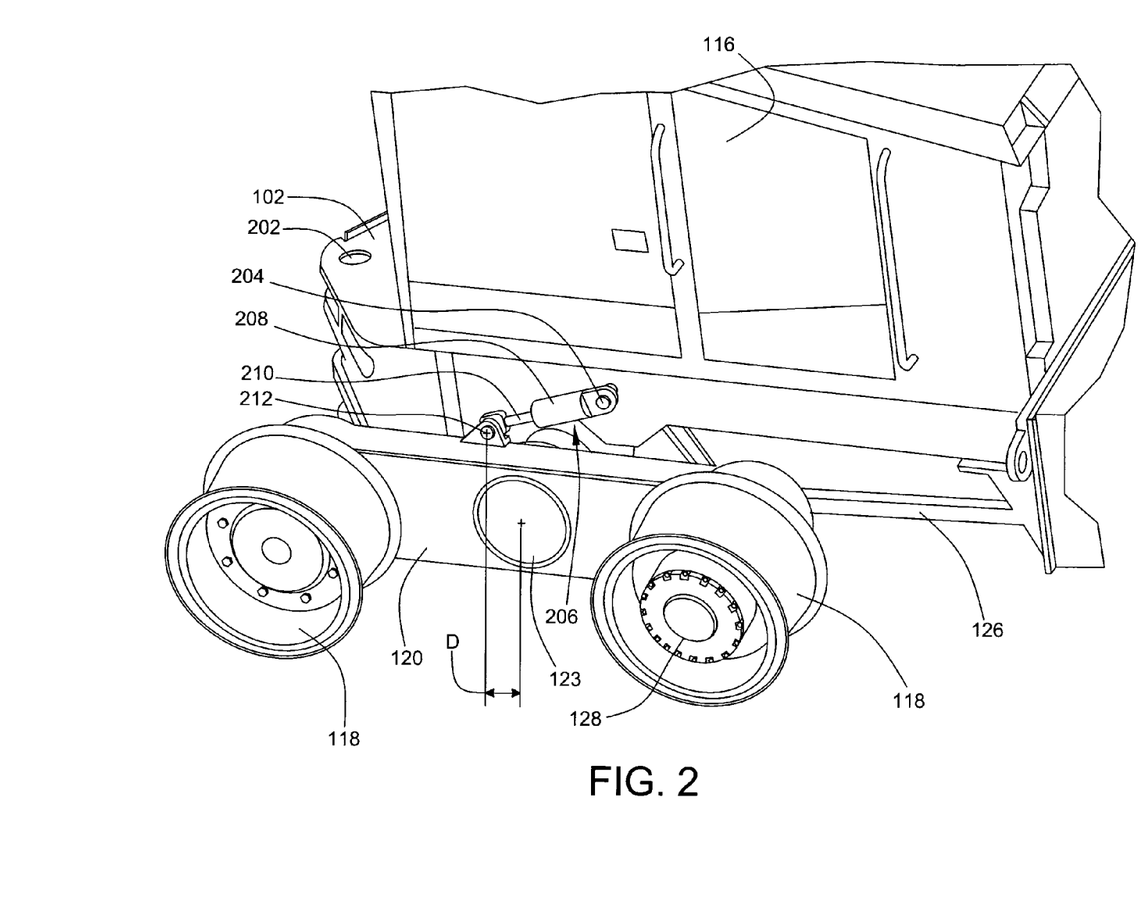
FIG. 2 is a partial outline view of a motor grader having an actuator associated with a tandem beam thereof in accordance with the disclosure.

In the description that follows, components and systems of the machine 100 that are the same or similar to those already described are denoted by the same reference numerals as previously used for simplicity. A partial view of a load balancing arrangement that is associated with the beam 120 of the motor grader 101 is shown in FIG. 2. In this illustrated embodiment, the engine frame 102 is shown detached from the motor grader 101 at a pivoting joint 202, and the wheels 118 are shown with their respective tires removed for clarity. Moreover, even though one side of the motor grader 101 is shown, the other side includes a similar configuration.

The engine frame 102 includes a chassis pin 204 that is integrated therewith and that extends from away from the engine frame 102 along a lateral portion thereof. The chassis pin 204 pivotally accepts a linear actuator 206. In the illustrated embodiment, the linear actuator 206 is a hydraulic actuator having a bore 208 that reciprocally accepts a piston. The piston is connected to an actuator arm 210 and is arranged to move relative to the bore 208 when fluid under pressure is applied to either side of the piston. One end of the actuator arm 210 is pivotally connected to the beam 120 at a drive pin 212.

In one embodiment, the linear actuator 206 is arranged to impart a torque or load that tends to rotate the beam 120 about the bearing 123 relative to the engine frame 102. Thus, the location of the drive pin 212 in the illustrated embodiment is disposed at a distance, D, away from the bearing 123 along the beam 120. One can appreciate that, in the illustrated embodiment, extension of the linear actuator 206 will impart a load that tends to rotate the beam 120 in a counterclockwise direction relative to the engine frame 102, while retraction of the linear actuator 206 will tend to rotate the beam 102 in the opposite direction. In an alternate embodiment, the linear actuator 206 may be replaced by a rotary actuator (not shown) that is integrated with or otherwise disposed within the bearing 123. Moreover, even though one linear actuator 206 is shown connecting the engine frame 102 with the beam 120, more than one actuator may be used. As noted above, a corresponding linear actuator (not shown) is connected to another beam 120 on the starboard side of the motor grader 101.

Figure 3:
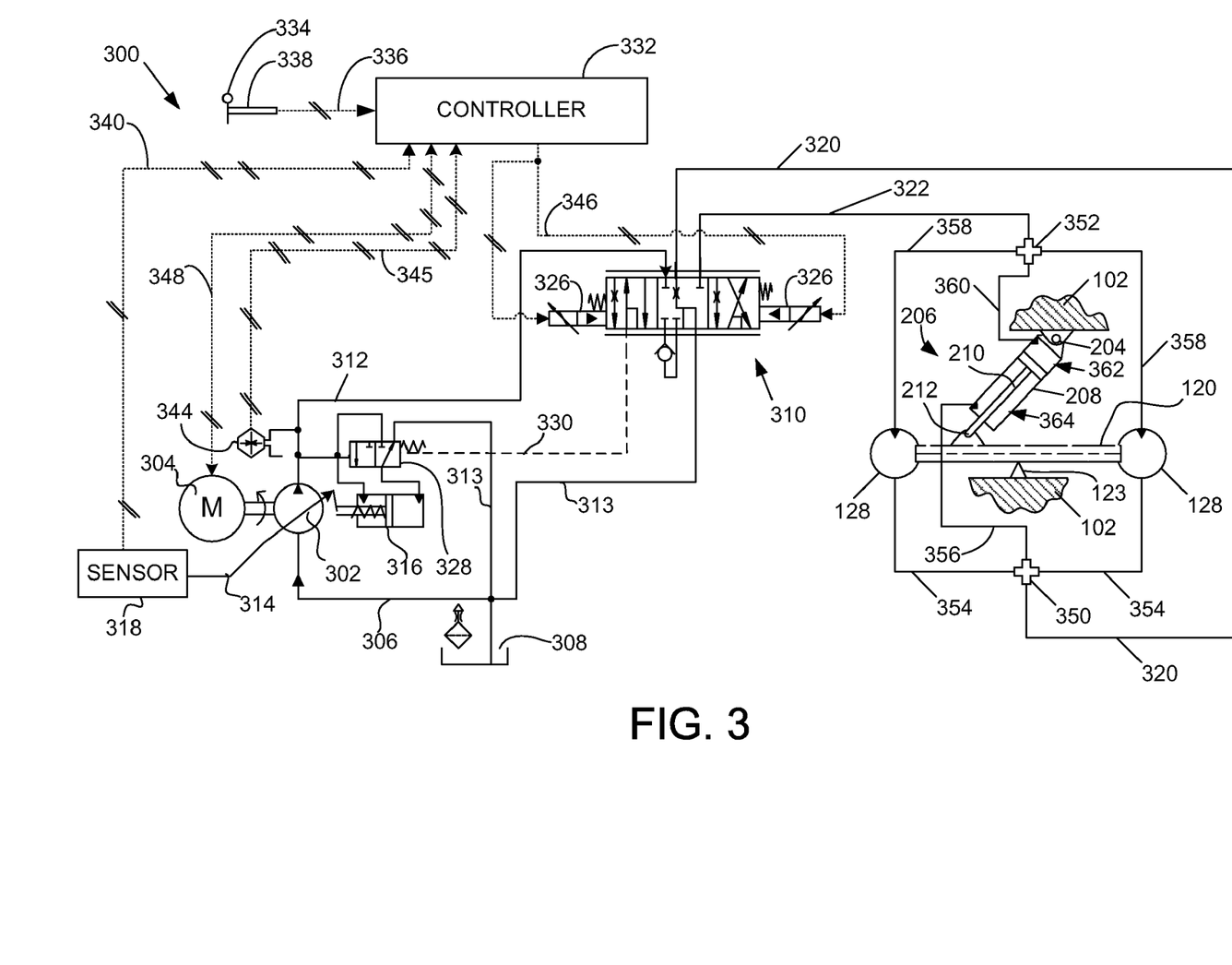
FIG. 3 is a block diagram of a hydraulic system in accordance with the disclosure.

A simplified diagram for a hydraulic system 300 is shown in FIG. 3. The hydraulic system 300 illustrates one possible embodiment for operating and controlling the operation of the linear actuator 206. The hydraulic system 300 illustrates a subset of a larger hydraulic circuit that is associated with the motor grader 101 that operates at least a portion of the propel system of the machine 100 (FIG. 1). As can be appreciated, hydraulic components and connections that are associated with other systems of the machine 100 are not shown for simplicity. Thus, the simplified hydraulic system shown and described is presented for the sake of illustration and should not be construed as limiting to the scope of this disclosure.

The hydraulic system 300 includes a pump 302, which is preferably a variable displacement pump. The pump 302 is connected to a prime mover, in this case, the engine 304 of the machine. In an alternate embodiment, the pump 302 may be connected to another type of prime mover, for example, an electric motor. The pump 302 has an inlet conduit 306 connected to a vented reservoir or drain 308. When the engine 304 is operating, the pump 302 draws a flow of fluid from the drain 308 and, in this embodiment, provides a pressurized flow of fluid to an infinite-position seven-port two-way (7-2) valve 310 via a supply line or supply conduit 312. A drain port of the valve 310 is connected via a drain passage 313 to the drain 308. A control lever 314 is connected to a swashplate (not shown) internal to the pump 302 that is arranged to change the displacement of the pump 302. Motion of the control lever 314, in one embodiment, is accomplished by a hydraulic pump control actuator 316.

The hydraulic pump control actuator 316 in this embodiment is a two-way piston having a spring return. One side of the piston is connected to the outlet of the pump 302 along the supply conduit 312. The other side of the piston is selectively connected either to the supply conduit 312 or the drain 308 via a pump control valve 328. In one embodiment, the pump control valve 328 is a three-port-two-way (3-2) valve that can move in response to a reference pressure 330. The reference pressure 330 is supplied on one side of a sliding member of the pump control valve 328 and acts with a spring against the supply pressure of fluid in the supply conduit 312 such that the second side of the hydraulic pump control actuator 316 moves to decrease the displacement of the pump 302 as the reference pressure 330 increases.

The reference pressure 330, which can also be referred to as a load indicating or load sensing pressure, is supplied from an appropriate port of the 7-2 valve 310. In this arrangement, excessive pressure buildup in the circuit during operation of the machine 100 will increase the reference pressure 330, which in turn will operate to decrease the displacement of the pump 302 and reduce the pressure at the supply conduit 312 to protect the various components and systems of the machine 100.

An electronic controller 332 is associated with the hydraulic system 300 and is arranged to control and/or monitor the operation of various components and systems of the machine. The electronic controller 232 receives information from various sensors on the machine and provides control signals to various actuators of the machine. Such information is processed to allow the electronic controller 332 to issue appropriate commands to various actuators within the system during operation. Connections pertinent to the present description are shown but, as can be appreciated, other connections relative to the electronic controller 332 may also be present. Alternatively, or in addition, analogous connections may be employed to obtain analogous information and to provide analogous control signals. In this embodiment, the electronic controller 332 is connected to a control input 334 via a control signal line 336. The control input 334, shown schematically, may be a lever moveable by the operator of the vehicle to set a desired speed setting for the vehicle. The position of the control input 334 is translated to a command signal through a sensor 338 associated with the control input 334. The electronic controller 332 processes this control signal along with other parameters, for example, the speed of the engine 304, the temperature of fluid within the reservoir or drain 308, and so forth, to determine a desired angle or relative position of the swashplate that causes the machine to move at a desired speed or causes a desired motion or position of a work implement of the machine to be attained.

A sensor 318 is appropriately connected to the electronic controller 332 via a pump setting feedback line 340. The sensor 318 provides a position signal or other signal indicative of the position, setting, or angle of the swashplate within the pump 302. The electronic controller 332 also issues commands operating the various actuators in the hydraulic system 300. For example, a multi-channel engine communication line 348 provides the electronic controller 332 with information indicative of various engine parameters, such as engine speed and load, and provides commands and settings to various engine actuators and systems. Further, the electronic controller 332 is connected to a pressure sensor 344 via a pressure signal line 345. The pressure sensor 344 detects a pressure of fluid in the supply conduit 312 and provides a pressure signal that is indicative of such fluid pressure to the electronic controller 332 via the pressure signal line 345.

The pump 302 provides a flow of pressurized fluid through the supply conduit 312 when the engine 304 operates. Depending on the position of the 7-2 valve 310, fluid from the supply conduit 312 is routed into one of two conduits, either a first conduit 320 or a second conduit 322. The first and second conduits 320 and 322 are respectively connected to either side of two hydrostatic motors 324. The position of the 7-2 valve 310 is controlled by a valve actuator 326, disposed to reciprocally move the 7-2 valve 310 between two positions to cause the two hydrostatic motors 128 to rotate and propel the machine 100 in the desired direction. In the embodiment shown, the valve actuator 326 includes two solenoid actuators, each disposed to move the 7-2 valve 310 in one direction in response to a drive signal from the electronic controller 332. The drive signal is provided at a drive signal line 346 connecting the electronic controller 332 with each of the two valve actuators 326.

In the illustration of FIG. 3, a single tandem beam 120 is represented as having two hydrostatic motors 128 connected thereto. It can be appreciated that both sides of the machine could have been represented, in which case four motors would be shown. In an alternate embodiment, a single hydrostatic motor 128 may be used in each of the two tandem beams 120 of the machine 100 (FIG. 1). The advantages of the present disclosure are equally applicable not only to machines having tandem drive arrangements that include two motors, but to any tandem drive arrangement that includes one or more motors associated with each tandem beam.

In the preceding description as well as in the description that follows, like or similar components or systems are denoted by the same reference numerals as previously used for simplicity. As shown schematically in FIG. 3, the beam 120 is pivotally connected to the engine frame 102 at the bearing 123. The linear actuator 206 pivotally interconnects the engine frame 102 with the beam 120 at, respectively, the chassis pin 204 and the drive pin 212. When the machine 100 is in motion, a flow of pressurized hydraulic fluid passes through the first conduit 320 or the second conduit 322. The direction of such fluid flow depends on the direction of travel of the machine 100 that is being commanded by the operator. For example, fluid is supplied from the 7-2 valve 310 in the second conduit 322 to the hydrostatic motors 128 when the machine 100 is travelling in the forward direction. During this time, the fluid passes through both hydrostatic motors 128 causing them to rotate, and returns to the 7-2 valve 310 via the first conduit 320 before being provided to the drain 308 via the drain passage 313. Similarly, fluid is supplied to the first conduit 320 and returns to the drain 308 via the second conduit 322 when the machine 100 is travelling in the reverse direction.

More specifically, the flow of fluid in the respective first conduit 320 or second conduit 322 that causes the hydrostatic motors 128 to rotate is provided at a drive pressure, $P_{drive}$. The work carried by the pressurized fluid is transformed into mechanical work at the hydrostatic motors 128. The fluid returning from the hydrostatic motors 128 is at a lower or return pressure, $P_{drain}$. The pressure difference across the motors 128 causes rotating elements therein to rotate, thus rotating the motors 128 and the drive wheels 118 (FIG. 1) that are connected thereto.

In one embodiment, each of the first conduit 320 and the second conduit 322 is fluidly connected to, respectively, a first junction 350 and a second junction 352. The first junction 350 fluidly interconnects two motor conduits 354 and a first actuator conduit 356 to one another and to the first conduit 320. Similarly, the second junction 352 fluidly interconnects two additional motor conduits 358 and a second actuator conduit 360 to one another and to the second conduit 322. Each pair of one of the two motor conduits 354 and one of the two additional motor conduits 358 operates to provide a supply and return path for the flow of fluid passing through each of the two hydrostatic motors 128 during operation. The direction of flow through each hydrostatic motor 128 depends on the direction of motion of the machine 100. The first actuator conduit 356 is fluidly connected to a first side 362 of the linear actuator 206, and the second actuator conduit 360 is fluidly connected to a second side 364 of the linear actuator 206. The first and second sides 362 and 364 are at least partially defined by respective hydraulic faces of a piston 366. The piston 366 is slidably disposed within the bore 208 and is connected to the actuator arm 210 such that the actuator arm 210 can extend or retract when fluid at different pressures is applied within the first and second sides 362 and 363. As can be appreciated, pressure forces acting on the piston 366 can be arranged to yield a net force that moves the piston 366 relative to the bore 208.

During operation, fluid supplied at the drive pressure $P_{drive}$ to one side of the hydrostatic motors 128 is also supplied to one side of the linear actuator 206. At the same time, fluid is removed from the hydrostatic motors 128 at the return pressure $P_{drain}$, which is also present at the other side of the linear actuator 206. The difference between the supply pressure and return pressure acting on either side of the linear actuator 206 causes a net force, F, to be generated by the linear actuator 206. The force F is directly applied to the beam 120. The direction and magnitude of the net force F acting on the beam 120 depends on the direction and speed of rotation of the hydrostatic motors 128. A detail view of various forces acting on the beam 120 during motion on the machine in one direction is shown in FIG. 4.

Figure 4:
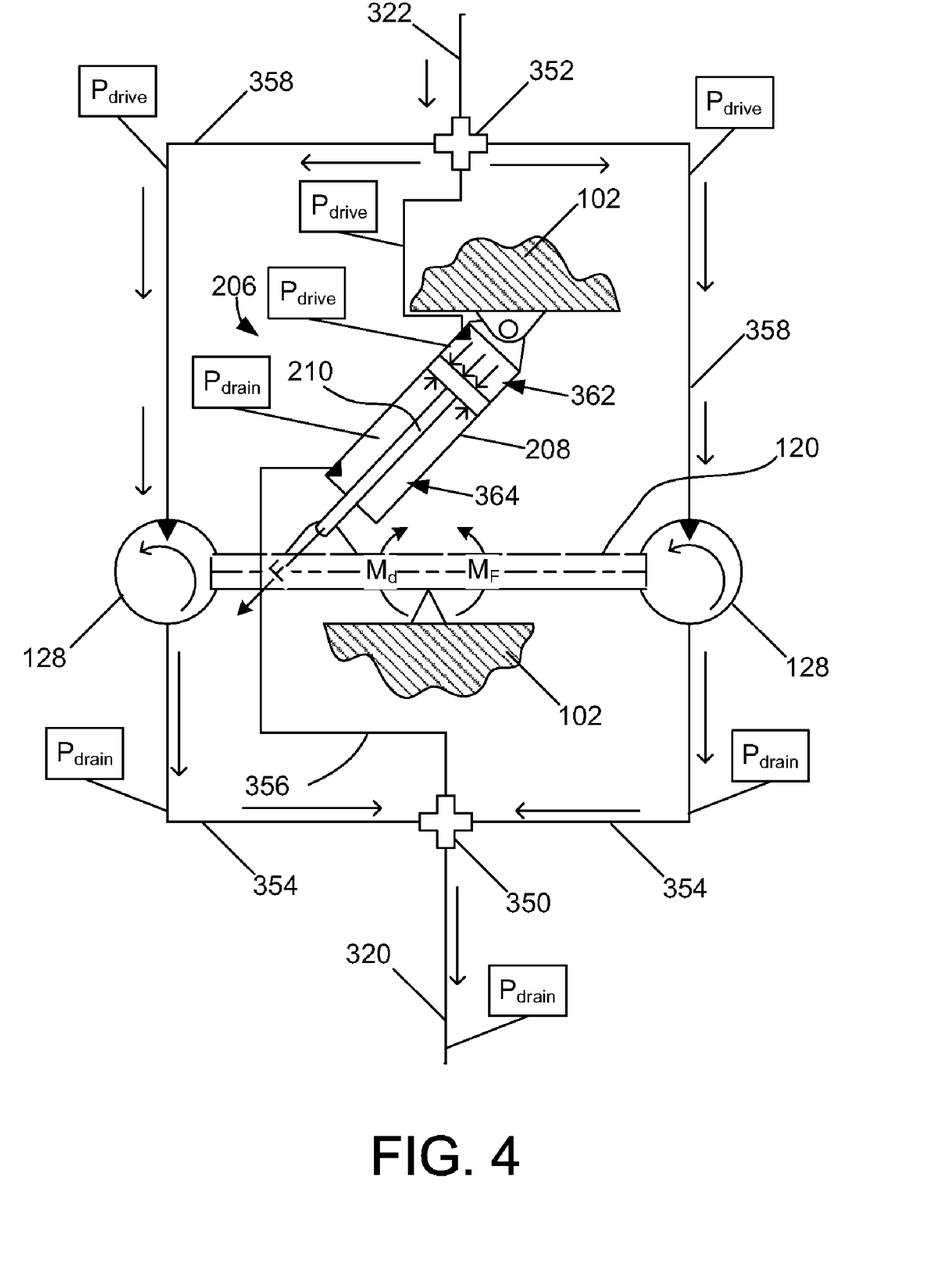
FIG. 4 is a detail view of the block diagram shown in FIG. 3.

In the illustration of FIG. 4, the flow of fluid is denoted by open-headed arrows. The direction of flow shown applies when the machine is travelling in one direction, and would be reversed during travel in the opposite direction. Indications of the operating pressures $P_{drive}$ or $P_{drain}$ on various portions of the system are annotated. The force F acting on the beam 120 is the net result of pressure forces acting on the piston 366. The pressure difference between the pressures $P_{drive}$ and $P_{drain}$ acting on both sides 362 and 364 of the linear actuator 206 provides the net force F.

In the illustrated example, the supply pressure $P_{drive}$ acting on the first side 362 of the piston 366 yields a force F tending to extend the actuator arm 210. At the same time, the second side 364 of the piston 366 is exposed to the return pressure $P_{drain}$ that yields a force tending to retract the actuator arm 210. The supply pressure $P_{drive}$ is higher than the return pressure $P_{drain}$. The net force F applied to the actuator arm 210, as shown in this exemplary illustration, tends to extend the actuator arm 210. The force F applied to the beam 120 creates a moment, $M_F$ about the pivot point of the beam 120 in the bearing 123. Simultaneously, the hydrostatic motors 128 are operating to rotate the drive wheels 118 (FIG. 1) in the direction shown and denoted by curved-line arrows. The independent rotation of the drive wheels 118 can create a load imbalance on the beam 120, which creates a moment $M_d$ tending to rotate the beam 120 and lift one of the wheels 118, the one shown on the left side of the figure, off the ground. Such moment $M_d$ can be especially prevalent under conditions of acceleration, such as initiation of motion or stopping of the machine or conditions of steady state operation during which the torque delivered to the two drive wheels 118 is not balanced. Such steady state imbalances may result from uneven flow of fluid reaching each of the hydrostatic motors 128, different motor efficiencies, and so forth. The net force F acting on the beam 120 by action of the linear actuator 206 acts to at least partially counteract any force imbalances present at the beam 120 during operation and ensures proper ground contact of each of the drive wheels 118 that are connected to the beam 120. In one embodiment, the force moment $M_F$ can be arranged to be at least equal to the drive moment $M_d$ such that the drive moment $M_d$ can be effectively cancelled.

Figure 5:
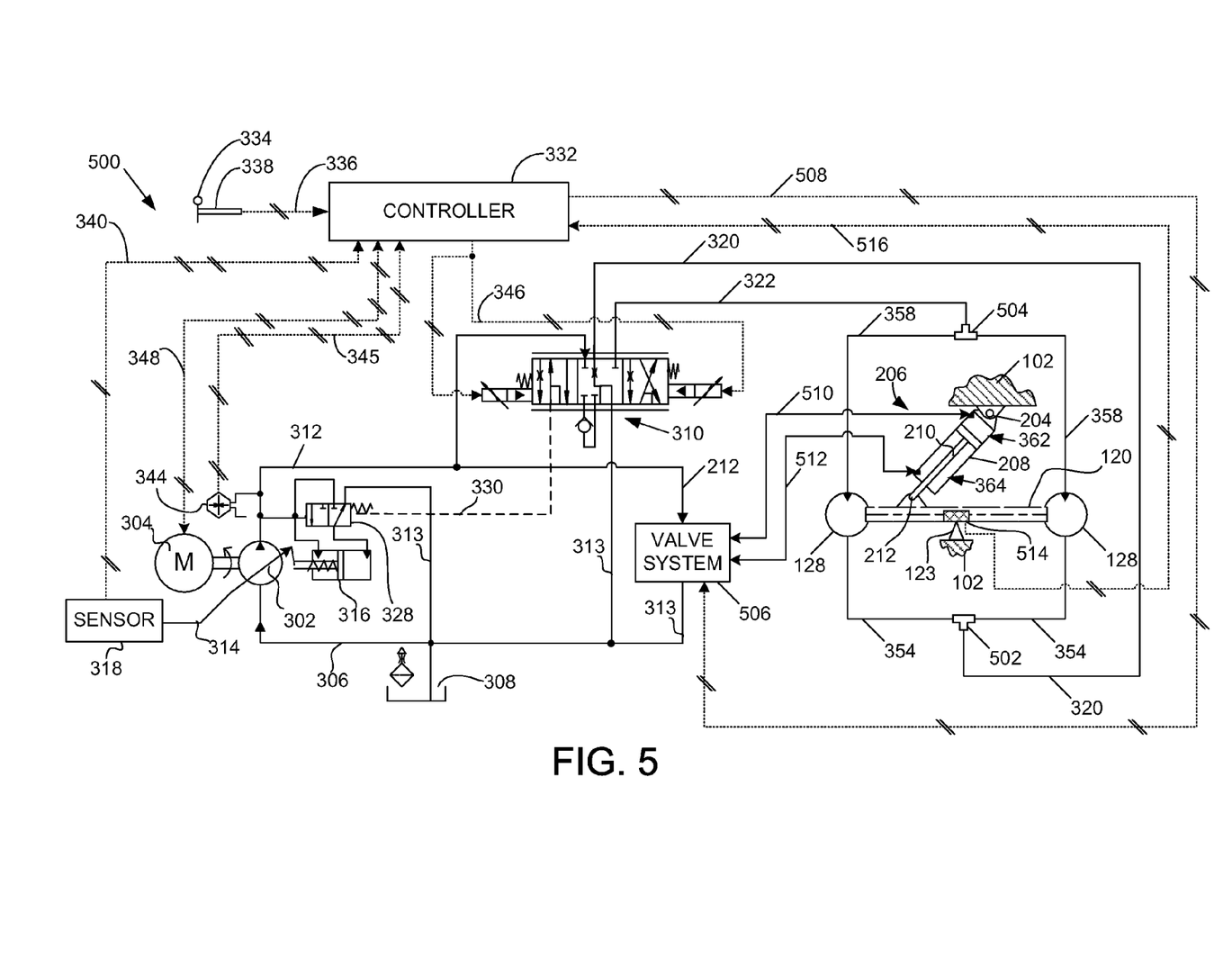
FIG. 5 is a block diagram of an alternate embodiment of a hydraulic system in accordance with the disclosure.

An alternate embodiment for a hydraulic system 500 is shown in FIG. 5. In this illustration, like components or systems as illustrated in FIG. 3 and described relative thereto are denoted by the same reference numerals as previously used for simplicity. The hydraulic system 500 includes a first junction 502 that fluidly interconnects the first conduit 320 with the two motor conduits 354. In this embodiment, there is no direct fluid connection between the first junction 502 and the linear actuator 206. Similarly, a second junction 504 fluidly interconnects the second conduit 322 with the two additional motor conduits 358. Likewise, there is no direct fluid connection between the second junction 504 and the linear actuator 206. Instead, the linear actuator 206 is connected to a valve system 506.

The valve system 506 may include one or more hydraulic valves that are electronically controlled. The valve system 506 may include any appropriate valve arrangement, for example, a four-port two-position (4-2) valve (not shown), or a more complicated valve arrangement that includes relief valves or the like. In one embodiment, the valve system 506 includes a three-port two-way (3-2) valve (not shown) that is operated by an electrical actuator (not shown) in response to a control signal provided by the electronic controller 332 via a command line 508. The valve system 506 is connected to the supply conduit 312 and the drain passage 313, and is arranged to selectively route a portion of the supply pressure in the supply conduit 312 to the first side 362 or the second side 364 of the linear actuator 206 via, respectively, a first control conduit 510 and a second control conduit 512. When one of the first control conduit 510 or the second control conduit 512 is connected to supply pressure in the supply conduit 312 via the valve system 506, the other can be connected to the drain passage 313 such that a net extending or retracting force of the linear actuator 206 is imparted to the beam 120.

The direction and magnitude of the net force acting on the beam 120 by the linear actuator 206 may be controlled by the electronic controller 332. Hence, in one embodiment, the electronic controller 332 may receive information indicative of the balance state of the beam 120. Such information may be inferred based on information provided by the pressure sensor 344 and/or the displacement sensor 318, or it may be measured directly by a sensor 514 that is associated with the beam 120. The sensor 514 may be a rotational displacement sensor disposed to quantify the rotational position of the beam 120 relative to the engine frame 102, or may alternatively be a strain sensor that is disposed to measure the stresses present within the beam 120. In either case, information is sent to the electronic controller 332 by the sensor 514 via a beam information line 516. The electronic controller 332 may use such information to infer a loading condition of the beam 120 and, based on such inference, calculate an appropriate command for the valve system 506 such that any imbalance conditions are rectified.

In yet another alternate embodiment, the valve system 506 may cause the linear actuator 206 to operate in conditions when no torque imbalance is present in the beam 120 due to operation of the hydrostatic motors 128. For example, in cases when one of the two drive wheels 118 (FIG. 1) becomes damaged, the linear actuator 206 can cause the beam 120 to rotate relative to the engine frame 102 such that the damaged wheel 118 is lifted from the ground and further damage is avoided while the motor grader 101 returns from the field for service.

INDUSTRIAL APPLICABILITY

The present disclosure is applicable to machines using tandem wheel configurations having one or more wheels powered by motors. Although a motor grader is illustrated in FIG. 1, the term "machine" may refer to any machine that performs some type of operation associated with an industry such as mining, construction, farming, transportation, or any other industry known in the art. The machine 100 (FIG. 1) may alternatively be a wheel loader, excavator, dump truck, backhoe, material handler or the like. Similarly, although a blade 110 (FIG. 1) is illustrated as the attached implement, an alternative implement may be included. Any implements may be utilized and employed for a variety of tasks, including, for example, loading, compacting, lifting, brushing, and include, for example, buckets, compactors, forked lifting devices, brushes, grapples, cutters, shears, blades, breakers or hammers, augers, and others.

Further, even though a tandem drive arrangement is described relative to use of motors, one can appreciate that the devices and methods for balancing load described herein are equally applicable to drive arrangements using different forms of motive devices, for example, electric motors, pneumatic devices, and so forth, and may even be applicable to other industries, for example, electrically driven wheels for trucks associated with rail cars, etc. Regardless of the type of machine used or the type of implement employed, the methods described herein are advantageously capable of improving the performance of any machine by increasing fuel economy and decreasing stopping distances for machines having tandem drive arrangements by ensuring that all drive wheels of the machine are in contact with a substrate surface and share their load equally.

We claim:

1. A tandem drive arrangement including one or more independently driven wheels arranged in a tandem configuration along a tandem beam, the tandem beam rotatably connected to a frame of a machine, the tandem drive arrangement further comprising:
   at least one hydrostatic motor operating at least one of the one or more independently driven wheels;
   a hydraulic system having a variable displacement hydraulic pump connected to an output of an engine, the hydraulic system including:
      a valve disposed to receive a flow of hydraulic fluid from the variable displacement hydraulic pump;
      a first conduit connected to the valve and disposed to selectively receive a flow of hydraulic fluid therefrom;
      a drain passage connected to a reservoir;
      a second conduit connected to the valve and disposed to be selectively fluidly connected to the drain passage;
      a motor supply conduit and a motor return conduit connected to the at least one hydrostatic motor and arranged to provide a flow of driving fluid therethrough;
      a first junction fluidly connecting the motor supply conduit with the first conduit;
      a second junction fluidly connecting the motor return conduit with the second conduit;
      a first fluid port arranged to provide fluid to one side of the linear actuator and being connected to the first junction; and
      a second fluid port arranged to provide fluid to another side of the linear actuator and being connected to the second junction;
   a chassis pin extending from the frame;
   an actuator operating to selectively impart a rotating moment to the tandem beam, the rotating moment tending to rotate the tandem beam, wherein the actuator is a linear actuator rotatably connected at one end thereof to the chassis pin, and rotatably connected at another end thereof to the beam at a drive pin, wherein the linear actuator operates to impart the rotating moment when the linear actuator extends and when the linear actuator retracts;
   wherein rotation, due to being driven, of the one or more independently driven wheels causes a torque imbalance tending to rotate the tandem beam, the torque imbalance being counteracted by the rotating moment imparted by the actuator.

2. The tandem drive arrangement of claim 1, wherein the linear actuator operates hydraulically and includes a piston connected to an actuator arm and disposed within a bore, wherein the bore is rotatably connected to the chassis pin and wherein the actuator arm is rotatably connected to the tandem beam at a location that is disposed at a distance from a pivot point between the tandem beam and the frame.

3. The tandem drive arrangement of claim 1, wherein the linear actuator provides a counter-rotating moment to the tandem beam when the at least one hydrostatic motor is operating and is providing a driving moment that tends to rotate the tandem beam.

4. The tandem drive arrangement of claim 1, wherein the tandem drive arrangement further includes:
   an electronic controller;
   a valve system that selectively provides fluid pressure to one of two control conduits that are connected thereto in response to a control signal;
   a sensor providing a signal that is indicative of a stress condition in the beam;
   wherein the two control conduits are each fluidly connected to a respective side of the linear actuator such that fluid pressure present at either one of the two control conduits causes the linear actuator to respectively extend and retract;
   wherein the electronic controller is disposed to receive the signal that is indicative of the stress condition in the tandem beam and provide the control signal to the valve system; and
   wherein the valve system causes the fluid pressure to be provided to an appropriate one of the two control conduits such that a stress causing the stress condition in the tandem beam is reduced.

5. The tandem drive arrangement of claim 1, wherein the machine is a motor grader having an axle connected to the frame, wherein the beam is connected at one end of the axle with a bearing disposed therebetween and wherein a second tandem beam is connected at another end of the axle with an additional bearing disposed therebetween.

6. The tandem drive arrangement of claim 1, further including:
   an electronic controller;
   a valve system disposed to selectively provide fluid at a pressure into one of two control conduits in response to a control signal, wherein the actuator is a linear actuator and wherein the two control conduits are fluidly connected to the linear actuator;
   a sensor associated with the tandem beam and disposed to provide a sensor signal that is indicative of a torque imbalance in the tandem beam;
   wherein the electronic controller provides the control signal in response to the sensor signal such that a force imparted by the linear actuator on the tandem beam operates to balance the torque imbalance.

7. A machine including a hydraulic system having a hydraulic pump connected to an output of an engine, the hydraulic system including at least one hydrostatic motor connected to a drive wheel of the machine and to a tandem beam, the machine further comprising:
   a frame having a chassis pin extending therefrom;
   a beam rotatably connected to the frame and having at least one motor connected at one end thereof;
   at least one additional wheel associated with the beam and being in tandem arrangement with the drive wheel;
   a linear actuator rotatably connected at one end thereof to the chassis pin, and rotatably connected at another end thereof to the tandem beam at a drive pin;
   the hydraulic system of the machine comprising:
      a valve disposed to receive a flow of hydraulic fluid from the hydraulic sum
      a first conduit connected to the valve and disposed to selectively receive a flow of hydraulic fluid therefrom;

a drain passage connected to a reservoir;

a second conduit connected to the valve and disposed to be selectively fluidly connected to the drain passage;

a motor supply conduit and a motor return conduit connected to the at least one hydrostatic motor and arranged to provide a flow of driving fluid therethrough;

a first junction fluidly connecting the motor supply conduit with the first conduit;

a second junction fluidly connecting the motor return conduit with the second conduit;

a first fluid port arranged to provide fluid to one side of the linear actuator and being connected to the first junction; and a second fluid port arranged to provide fluid to another side of the linear actuator and being connected to the second junction;

wherein the linear actuator operates to impart a moment tending to rotate the tandem beam when the linear actuator extends and when the linear actuator retracts, wherein the linear actuator operates hydraulically and includes a piston connected to an actuator arm and disposed within a bore, wherein the bore is rotatably connected to the chassis pin and wherein the actuator arm is rotatably connected to the tandem beam at a location that is disposed at a distance from a pivot point between the tandem beam and the frame.

8. The machine of claim 7, wherein the linear actuator provides a counter-rotating moment to the tandem beam when the at least one motor is operating and is providing a driving moment that tends to rotate the tandem beam.

9. The machine of claim 7, wherein the machine further includes:

an electronic controller;

a valve system that selectively provides fluid pressure to one of two control conduits that are connected thereto in response to a control signal;

a sensor providing a signal that is indicative of a stress condition in the tandem beam;

wherein the two control conduits are each fluidly connected to a respective side of the linear actuator such that fluid pressure present at either one of the two control conduits causes the linear actuator to respectively extend and retract;

wherein the electronic controller is disposed to receive the signal that is indicative of the stress condition in the tandem beam and provide the control signal to the valve system; and wherein the valve system causes the fluid pressure to be provided to an appropriate one of the two control conduits such that a stress causing the stress condition in the tandem beam is reduced.

10. The machine of claim 7, further including:

at least one additional motor connected between the at least one additional wheel and the tandem beam, the at least one additional motor connected to the tandem beam at another end thereof;

wherein the drive pin is disposed on the tandem beam between the at least one motor and the at least one additional motor.

11. The machine of claim 7, wherein the machine is a motor grader having a drive axle connected to the frame, wherein the tandem beam is connected at one end of an axle with a bearing disposed therebetween and wherein a second tandem beam is connected at another end of the axle with an additional bearing disposed therebetween.

12. The machine of claim 9, further including:

an electronic controller;

a valve system disposed to selectively provide fluid at a pressure into one of two control conduits in response to a control signal, wherein the two control conduits are fluidly connected to the linear actuator;

a sensor associated with the tandem beam and disposed to provide a sensor signal that is indicative of a torque imbalance in the tandem beam;

wherein the electronic controller provides the control signal in response to the sensor signal such that a force imparted by the linear actuator on the tandem beam operates to balance the torque imbalance.

13. A method for balancing load in a tandem drive arrangement of a machine that includes at least one independently driven wheel operated by a motor, the motor creating a torque imbalance tending to rotate a tandem beam relative to a frame of the machine, the tandem beam including at least one additional wheel that tends to lose contact with the ground when the tandem beam rotates due to the torque imbalance, the method comprising:

supplying a flow of fluid to the motor via a motor supply conduit or a motor return conduit, each of the supply and return conduits including a junction such that a fluid pressure to the motor is simultaneously provided to two sides of an actuator through the corresponding junction in the supply and return conduits;

applying a force on the tandem beam with the actuator, the force producing a rotating moment that counteracts the torque imbalance; and maintaining contact between the at least one additional wheel and the ground.

14. The method of claim 13, further including selectively lifting at least one additional wheel connected to the tandem beam from the ground by applying an appropriate force with the actuator.

15. The method of claim 13 further including sensing the torque imbalance in the tandem beam with a sensor, providing a sensor signal to an electronic controller, determining a control signal in the electronic controller based on the sensor signal, providing the control signal to a valve system, and actuating the actuator with the valve system such that the torque imbalance is cancelled.

16. The method of claim 13, wherein applying the force on the tandem beam includes at least one of applying the force at a distance from a pivot point connecting the tandem beam to the frame.

* * * * *